US010489961B2

(12) United States Patent
Festa et al.

(10) Patent No.: US 10,489,961 B2
(45) Date of Patent: Nov. 26, 2019

(54) SYSTEMS AND METHODS FOR GENERATING TEXTURED THREE-DIMENSIONAL MODELS

(71) Applicants: Michael Silvio Festa, Wakefield, MA (US); Rebecca W. Perry, Brookline, MA (US); Patrick G. Clark, North Billerica, MA (US)

(72) Inventors: Michael Silvio Festa, Wakefield, MA (US); Rebecca W. Perry, Brookline, MA (US); Patrick G. Clark, North Billerica, MA (US)

(73) Assignee: Wayfair LLC, Boston, MA (US)

( * ) Notice: Subject to any disclaimer, the term of this patent is extended or adjusted under 35 U.S.C. 154(b) by 16 days.

(21) Appl. No.: 15/894,877

(22) Filed: Feb. 12, 2018

(65) Prior Publication Data
US 2019/0251733 A1  Aug. 15, 2019

(51) Int. Cl.
G06T 15/04 (2011.01)
G06T 7/49 (2017.01)
(Continued)

(52) U.S. Cl.
CPC .............. G06T 15/04 (2013.01); G06T 7/49 (2017.01); G06T 15/506 (2013.01); G06T 17/20 (2013.01);
(Continued)

(58) Field of Classification Search
CPC .......... G06T 15/04; G06T 17/20; G06T 7/49; G06T 15/506; G06T 2210/16;
(Continued)

(56) References Cited

U.S. PATENT DOCUMENTS 8,416,236 B1 * 4/2013 Hickman ............... G06T 19/20
345/419
8,462,206 B1 * 6/2013 McGuire ............... G06T 1/0007
348/135
(Continued)

OTHER PUBLICATIONS

[No Author Listed], TAC7 Scanner. Physical material scanner for X-Rite's Total Appearance Capture Ecosystem. X-Rite Pantone. Mar. 2017. 2 pages, Mar. 2017.
(Continued)

Primary Examiner — Maurice L. McDowell, Jr.
(74) Attorney, Agent, or Firm — Wolf, Greenfield & Sacks, P.C.

(57) ABSTRACT

According to at least one aspect, a system is provided. The system comprises at least one hardware processor; and at least one non-transitory computer-readable storage medium storing processor executable instructions that, when executed by the at least one hardware processor, cause the at least one hardware processor to perform: generating a 3-dimensional (3D) model of an object at least in part by analyzing a first plurality of images of the object captured using a first scanning device; generating a texture model of a texture of a material at least in part by analyzing a second plurality of images of the material captured using a second scanning device different from the first scanning device, the material being separate and distinct from the object; and applying the texture model to the 3D model to generate a textured 3D model of the object.

20 Claims, 5 Drawing Sheets

(51) Int. Cl.
*G06T 15/50* (2011.01)
*G06T 17/20* (2006.01)
*H04N 13/282* (2018.01)
*H04N 13/296* (2018.01)

(52) U.S. Cl.
CPC ......... *H04N 13/282* (2018.05); *H04N 13/296* (2018.05); *G06T 2200/08* (2013.01); *G06T 2207/10152* (2013.01); *G06T 2210/16* (2013.01); *G06T 2215/16* (2013.01)

(58) Field of Classification Search
CPC ....... G06T 2207/10152; G06T 2200/08; G06T 2215/16; H04N 13/282; H04N 13/296
See application file for complete search history.

(56) References Cited

U.S. PATENT DOCUMENTS

2005/0081161 A1* 4/2005 MacInnes ........... G06F 17/5004
715/765
2013/0043797 A1* 2/2013 Huang ............... H05B 37/0272
315/158
2014/0300702 A1* 10/2014 Saydkhuzhin .......... G06T 17/20
348/47
2015/0325044 A1* 11/2015 Lebovitz ................. G06T 15/04
345/420
2017/0324947 A1* 11/2017 Bruce .................... G01B 11/24

OTHER PUBLICATIONS

[No Author Listed], Wayfair Launches Virtual Reality App to Customize Outdoor Spaces with Furnishings and Décor. Wayfair. Aug. 23, 2016. 3 pages.

Sadalgi, Powering an Augmented & Virtual Reality. Wayfair. May 31, 2017. 20 pages.

Salvi, Using your smartphone as a material scanner. Allegorithmic. May 3, 2017. 48 pages.

* cited by examiner

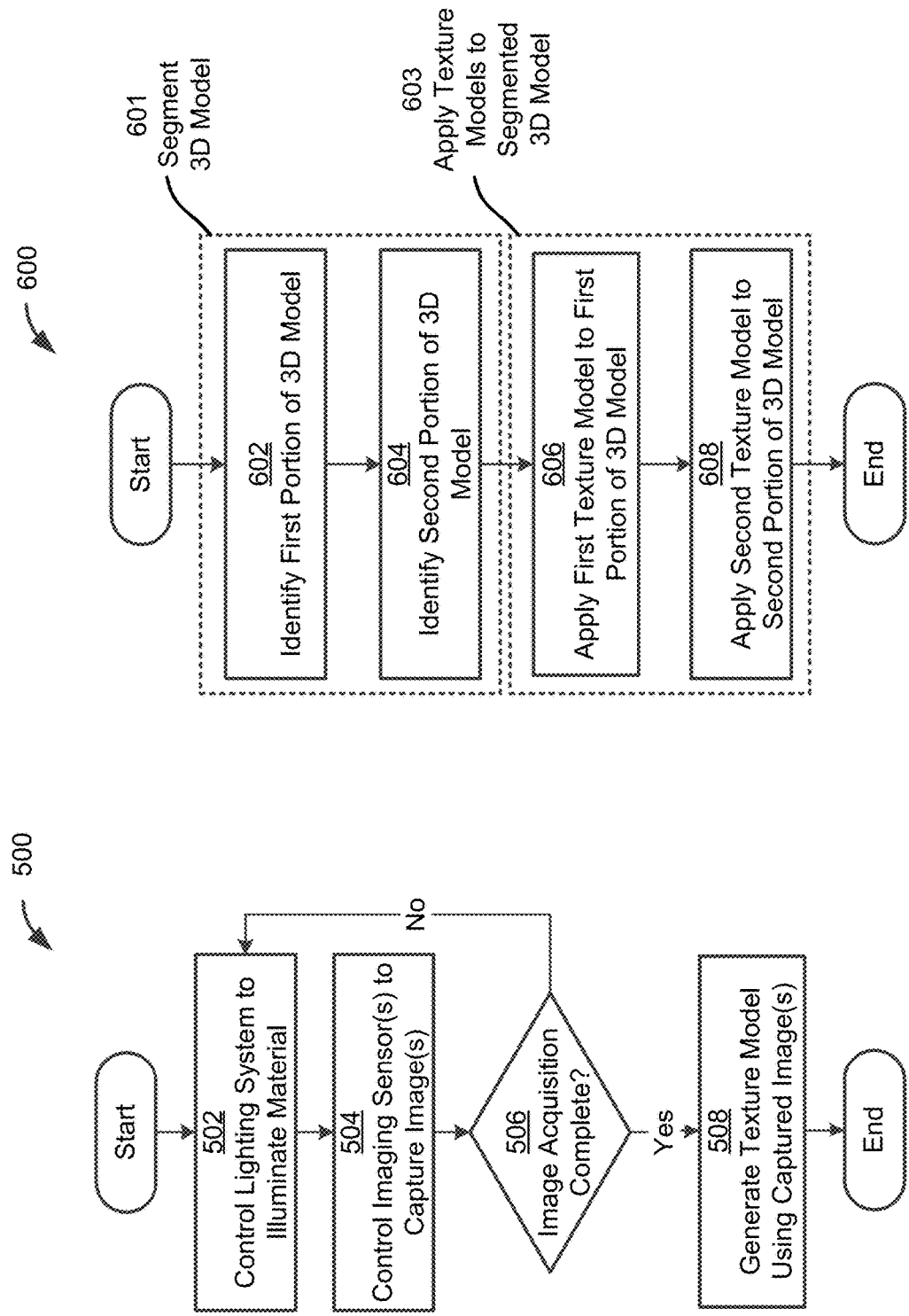

SYSTEMS AND METHODS FOR GENERATING TEXTURED THREE-DIMENSIONAL MODELS

BACKGROUND

Some companies primarily sell products (e.g., furniture, toys, clothing, and electronics) through an online computer interface instead of through conventional brick-and-mortar stores. As a result, consumers typically demand high-quality images of the products in multiple scenes because they are generally unable to see the product in-person prior to purchase. Accordingly, these companies typically ship each product to a studio where the product is placed in various scenes and photographed by a professional photographer. These captured images of the product in various scenes may be shown through the online computer interface to provide consumers an accurate representation of the product without seeing the product in-person.

SUMMARY

According to at least one aspect, a system is provided. The system comprises at least one hardware processor; and at least one non-transitory computer-readable storage medium storing processor executable instructions that, when executed by the at least one hardware processor, cause the at least one hardware processor to perform: generating a 3-dimensional (3D) model of an object at least in part by analyzing a first plurality of images of the object captured using a first scanning device; generating a texture model of a texture of a material at least in part by analyzing a second plurality of images of the material captured using a second scanning device different from the first scanning device, the material being separate and distinct from the object; and applying the texture model to the 3D model to generate a textured 3D model of the object.

In some embodiments, the system further comprises the first scanning device and the second scanning device.

In some embodiments, the first scanning device comprises: a rotation device that is configured to receive the object and rotate the object about at least one axis; and a plurality of imaging sensors configured to image the object.

In some embodiments, generating the 3D model comprises: controlling the plurality of imaging sensors to capture a first set of images of the object in a first position; controlling the rotation device to rotate the object from the first position to a second position different from the first position; controlling the plurality of imaging sensors to capture a second set of images of the object in the second position; and generating the 3D model using the first set of images and the second set of images.

In some embodiments, the second scanning device comprises: a housing configured to receive the material having the texture; at least one imaging sensor coupled to the housing and disposed above the material; and a lighting system coupled to the housing and comprising a plurality of light sources each configured to emit light to illuminate the material.

In some embodiments, generating the texture model comprises: controlling the lighting system to illuminate the material with light emitted by a first light source of the plurality of light sources disposed at a first position; controlling the at least one imaging sensor to capture a first image of the material illuminated with light from the first light source disposed at the first position; controlling the lighting system to illuminate the material with light emitted by a second light source of the plurality of light sources disposed at a second position that is different from the first position; controlling the at least one imaging sensor to capture a second image of the material illuminated with light from the second light source disposed at the second position; and generating the texture model using the first and second images.

In some embodiments, the 3D model comprises a polygonal mesh. In some embodiments, the texture model comprises at least one image.

According to at least one aspect, a method is provided. The method comprises generating a 3-dimensional (3D) model of an object at least in part by analyzing a first plurality of images of the object captured using a first scanning device; generating a texture model of a texture of a material at least in part by analyzing a second plurality of images of the material captured using a second scanning device different from the first scanning device, the material being separate and distinct from the object; and applying the texture model to the 3D model to generate a textured 3D model of the object.

In some embodiments, wherein generating the 3D model comprises: capturing, using a plurality of imaging sensors, a first set of images of an object in a first position; rotating, using a rotation device, the object from the first position to a second position that is different from the first position; capturing, using the plurality of imaging sensors, a second set of images of the object in the second position; and generating a 3-dimensional (3D) model of the object using the first set of images and the second set of images.

In some embodiments, generating the 3D model comprises: illuminating the object with a first light using a first light source; and capturing the first set of images while the object is illuminated with the first light.

In some embodiments, generating the 3D model comprises: illuminating the object with a second light that has a different spectrum from the first light using a second light source; and capturing, using the plurality of image sensors, a third set of images while the object is illuminated with the second light.

In some embodiments, generating the 3D model of the object comprises: generating the 3D model of the object using the first set of images, the second set of images, and the third set of images.

In some embodiments, generating the texture model comprises: illuminating, using a first light source disposed at a first position, the material with light; capturing, using at least one image sensor, a first image of the material illuminated with light from the first light source disposed at the first position; illuminating, using a second light source disposed at a second position that is different from the first position, the material with light; capturing, using the at least one imaging sensor, a second image of the material illuminated with light from the second light source disposed at the second position; and generating the texture model using the first and second images.

In some embodiments, illuminating the material with light using the first light source comprises: reading a light intensity value from at least one photodetector; and adjusting at least one setting of the first light source based on the light intensity value.

According to at least one aspect, at least one non-transitory computer-readable storage medium storing processor-executable instructions is provided. The processor-executable instructions, when executed by at least one processor, cause the at least one processor to perform: generating a 3-dimensional (3D) model of an object at least in part by analyzing a first plurality of images of the object captured using a first scanning device; generating a texture model of a texture of a material at least in part by analyzing a second plurality of images of the material captured using a second scanning device different from the first scanning device, the material being separate and distinct from the object; and applying the texture model to the 3D model to generate a textured 3D model of the object.

According to at least one aspect, a system is provided. The system comprises at least one hardware processor; and at least one non-transitory computer-readable storage medium storing processor executable instructions that, when executed by the at least one hardware processor, cause the at least one hardware processor to perform: receiving a 3-dimensional (3D) model of an object comprising a first section and a second section different from the first section; identifying a first portion of the 3D model that corresponds to the first section of the object; identifying a second portion of the 3D model that corresponds to the second section of the object; receiving a first texture model of a first texture and a second texture model of a second texture different from the first texture; applying the first texture model to the first portion of the 3D model; and applying the second texture model to the second portion of the 3D model.

In some embodiments, the object is a piece of furniture.

In some embodiments, each of the first texture and the second texture is selected from the group consisting of: a wood, a metal, a fabric, a leather, a glass, a ceramic, and a plastic.

In some embodiments, the first section of the object comprises a fabric and wherein the first texture model is a texture model of a fabric swatch.

In some embodiments, the fabric swatch is a swatch of the fabric in the first section of the object.

In some embodiments, applying the first texture model to the first section of the object comprises: applying the first texture model to the first section of the object using a UV map that describes a spatial relationship between at least part of the 3D model of the object and at least part of at least one texture model.

According to at least one aspect, a method is provided. The method comprises receiving a 3-dimensional (3D) model of an object comprising a first section and a second section different from the first section; identifying a first portion of the 3D model that corresponds to the first section of the object; identifying a second portion of the 3D model that corresponds to the second section of the object; receiving a first texture model of a first texture and a second texture model of a second texture different from the first texture; applying the first texture model to the first portion of the 3D model; and applying the second texture model to the second portion of the 3D model.

In some embodiments, applying the first texture model to the first section of the object comprises applying the first texture model to the first section of the object using a UV map that describes a spatial relationship between at least part of the 3D model of the object and at least part of at least one texture model.

According to at least one aspect, at least one non-transitory computer-readable storage medium storing processor-executable instructions is provided. The processor-executable instructions, when executed by at least one processor, cause the at least one processor to perform: receiving a 3-dimensional (3D) model of an object comprising a first section and a second section different from the first section; identifying a first portion of the 3D model that corresponds to the first section of the object; identifying a second portion of the 3D model that corresponds to the second section of the object; receiving a first texture model of a first texture and a second texture model of a second texture different from the first texture; applying the first texture model to the first portion of the 3D model; and applying the second texture model to the second portion of the 3D model.

According to at least one aspect, a system is provided. The system comprises a rotation device configured to receive an object and rotate the object about at least one axis; a plurality of imaging sensors configured to image the object and comprising at least two imaging sensors that are disposed a fixed distance apart from each other; and at least one computing device communicatively coupled to the rotation device, and the plurality of imaging sensors and configured to: control the plurality of imaging sensors to capture a first set of images of the object in a first position; control the rotation device to rotate the object from the first position to a second position that is different from the first position; control the plurality of imaging sensors to capture a second set of images of the object in the second position; generate a 3-dimensional (3D) model of the object using the first set of images and the second set of images; and identify a scale of the 3D model of the object using the fixed distance between the at least two imaging sensors of the plurality of imaging sensors.

In some embodiments, the system further comprises a lighting system configured to illuminate the object on the rotation device and comprising a first light source configured to emit a first light and at least one light diffusion element configured to diffuse the first light from the first light source.

In some embodiments, the at least one computing device is communicatively coupled to the lighting system and configured to control the lighting system to illuminate the object on the rotation device with the first light and wherein the first and second sets of images of the object are captured while the object is illuminated with the first light.

In some embodiments, the lighting system comprises a second light source that is configured to emit a second light having a different spectrum from that of the first light.

In some embodiments, the at least one computing device is configured to control the lighting system to illuminate the object on the rotation device with the second light and control the plurality of imaging sensors to capture a third set of images of the object illuminated with the second light.

In some embodiments, the first light comprises light having a wavelength between 450 nanometers (nm) and 650 nm and the second light comprises light having a wavelength between 315 nm and 400 nm.

In some embodiments, the system further comprises a spraying system configured to spray the object with a material that fluoresces when exposed to the second light.

In some embodiments, the at least one computing device is configured to control the plurality of imaging sensors to capture a third set of images of the rotation device without the object and generate the 3D model of the object using the first set of images, the second set of images, and the third set of images.

In some embodiments, the at least one computing device is configured to control the plurality of imaging sensors to capture a third set of images of a color calibration card comprising a plurality of known colors and calibrate at least some of the plurality of imaging sensors using the third set of images.

According to at least one aspect, a method is provided. The method comprises capturing, using a plurality of imaging sensors comprising at least two imaging sensors that are disposed a fixed distance apart from each other, a first set of images of an object in a first position; rotating, using a rotation device, the object from the first position to a second position that is different from the first position; capturing, using the plurality of imaging sensors, a second set of images of the object in the second position; generating, using at least one computing device, a 3-dimensional (3D) model of the object using the first set of images and the second set of images; and identifying, using the at least one computing device, a scale of the 3D model of the object using the fixed distance between the at least two imaging sensors of the plurality of imaging sensors.

In some embodiments, the method further comprises illuminating the object with a first light using a first light source.

In some embodiments, wherein capturing the first set of images comprises capturing the first set of images while the object is illuminated with the first light.

In some embodiments, capturing the second set of images comprises capturing the second set of images while the object is illuminated with the first light.

In some embodiments, the method further comprises illuminating the object with a second light that has a different spectrum from the first light using a second light source.

In some embodiments, the method further comprises capturing, using the plurality of image sensors, a third set of images of the object illuminated with the second light and generating, using the at least one computing device, the 3D model of the object using the first set of images, the second set of images, and the third set of images.

In some embodiments, illuminating the object with the first light comprises illuminating the object with light having a wavelength between 450 nanometers (nm) and 650 nm and wherein illuminating the object with the second light comprises illuminating the object with light having a wavelength between 315 nm and 400 nm.

In some embodiments, the method further comprises spraying, using a spraying system, the object with a material that fluoresces when exposed to the second light.

In some embodiments, the method further comprises capturing, using the plurality of imaging sensors, a third set of images of the rotation device without the object and generating, using the at least one computing device, the 3D model of the object using the first set of images, the second set of images, and the third set of images.

In some embodiments, the method further comprises capturing, using the plurality of imaging sensors, a third set of images of a color calibration card comprising a plurality of known colors and calibrating at least some of the plurality of imaging sensors using the third set of images.

According to at least one aspect, at least one non-transitory computer-readable storage medium storing processor-executable instructions is provided. The processor-executable instructions, when executed by at least one processor, cause the at least one processor to perform: controlling a plurality of imaging sensors to capture a first set of images of an object in a first position; controlling a rotation device to rotate the object from the first position to a second position that is different from the first position; controlling the plurality of imaging sensors to capture a second set of images of the object in the second position; generating a 3-dimensional (3D) model of the object using the first set of images and the second set of images; and identifying a scale of the 3D model of the object using a fixed distance between at least two imaging sensors of the plurality of imaging sensors.

According to at least one aspect, a scanning system is provided. The scanning system comprises a housing configured to receive a material and comprising a plurality of walls that at least partially enclose the material; at least one imaging sensor coupled to the housing and disposed above the material; a lighting system coupled to the housing and comprising a plurality of light sources each configured to emit light to illuminate the material; at least one photodetector configured to detect a light intensity level and disposed in the housing; and at least one computing device communicatively coupled to the at least one imaging sensor, the lighting system, and the at least one photodetector, the at least one computing device being configured to: control the lighting system to illuminate the material with light emitted by a first light source of the plurality of light sources disposed at a first position at least in part by reading a light intensity value from the at least one photodetector and adjusting at least one setting of the lighting system based on the light intensity value; control the at least one imaging sensor to capture a first image of the material illuminated with light from the first light source disposed at the first position; control the lighting system to illuminate the material with light emitted by a second light source of the plurality of light sources disposed at a second position that is different from the first position; capture, using the at least one imaging sensor, a second image of the material illuminated with light from the second light source disposed at the second position; and generate a texture model of a texture of the material using the first and second images.

In some embodiments, the housing comprises a base coupled to the plurality of walls and having a transparent surface configured to receive the material and a light source configured to emit light through the transparent surface.

In some embodiments, the material comprises a member selected from the group consisting of: a wood, a metal, a fabric, a leather, a glass, a ceramic, and a plastic.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 5 is a flowchart of an example process for generating a texture model of a texture of a material, according to some embodiments of the technology described herein;

FIG. 6 is a flowchart of an example process for applying a texture model to a 3D model, according to some embodiments of the technology described herein.

DETAILED DESCRIPTION

Figure 1:
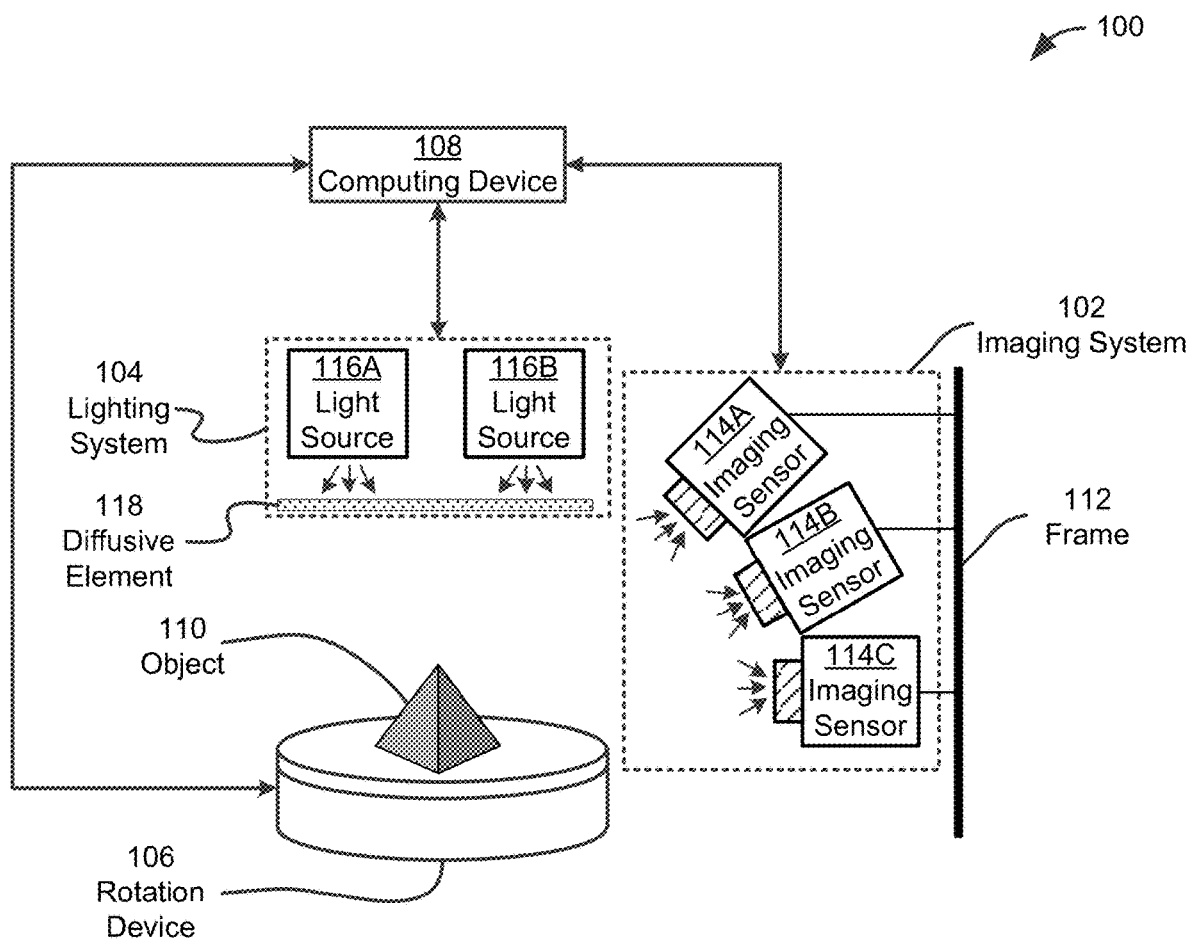
FIG. 1 is a diagram of an example three-dimensional (3D) scanning system, according to some embodiments of the technology described herein.

As mentioned above, consumers typically demand high-quality images of products in various scenes prior to purchase if they do not have the opportunity to see the products in-person. The inventors have appreciated that the conventional techniques employed to generate these high-quality images of products are prohibitively expensive and slow. For example, a company may have to incur the expense of ordering each product, shipping each product to a studio, and having each product photographed in multiple scenes. The expense is further exacerbated when there are multiple variations of the same product (e.g., color, size, and/or material). As one example, a company may have to generate high-quality images for 500 furniture designs each with 10 different fabric patterns and staged in 5 different scenes. In this example, the company would need to order 5,000 pieces of furniture (500 furniture designs*10 fabric patterns per furniture design), ship the 5,000 pieces of furniture to a studio, and photograph the 5,000 pieces of furniture 25,000 times (5,000 pieces of furniture*5 scenes per piece of furniture).

Accordingly, the inventors have developed new techniques to create high-quality images of products using, for example, textured 3D digital models (referred to as "textured 3D models" herein for simplicity) of the products. The textured 3D digital models of the products may comprise a 3D digital model (referred to as "3D models" herein for simplicity) that describes the shape of the product paired with a texture model that describes the appearance of the surfaces on the product, such as a color and/or shininess the surfaces. The 3D model may be, for example, a polygonal mesh and/or a point cloud model. The texture model may be, for example, a set of one or more images that may be applied to the 3D model. The textured 3D models of the products may be added to a model of a scene (e.g., a room in a house) that is, in turn, employed to create a high-quality image of the scene that includes the products. Thereby, a product may be scanned once to generate a textured 3D model and placed in any number of scenes and/or combined with any other products. Further, the texture model in the textured 3D model may be interchangeable for different texture models of different materials. Thereby, a product may only need to be scanned once to generate textured 3D models for multiple versions of the product constructed from different materials. As a result, the cost of creating high-quality images for products is substantially reduced. For example, a company may generate high-quality images for 500 furniture designs each with 10 different fabric patterns and staged in 5 different scenes by: ordering 500 pieces of furniture (1 piece of furniture in each design) and 10 fabric swatches (1 fabric swatch for each fabric pattern); generating 3D models for the 500 pieces of furniture; generating texture models for the 10 fabric swatches; and applying each of the 10 texture models to each of the 500 3D models to generate 5,000 textured 3D models that can each be placed into 5 scenes to generate 25,000 images. By contrast, using conventional techniques, the company would need to order 5,000 pieces of furniture, ship the 5,000 pieces of furniture to a studio, and photograph the 5,000 pieces of furniture 25,000 times.

Accordingly, a system is provided that is configured to generate a texture 3D model by separately generating a 3D model of an object (e.g., a product) and a texture model of a texture of a material (e.g., a wood, a metal, a fabric, a leather, a glass, a ceramic, and a plastic) and applying to the texture model to the 3D model of the object. Thereby, new textured 3D models for an object may be created by applying different texture models to the same underlying 3D model. In some embodiments, the system comprises hardware processor and at least one non-transitory computer-readable storage medium storing processor executable instructions that, when executed by the at least one hardware processor, cause the at least one hardware processor to perform a textured 3D model generation process. In these embodiments, the instructions may cause the at least one hardware processor to generate a 3D model of an object at least in part by analyzing a first plurality of images of the object captured using a first scanning device. The first plurality of images of the object may be captured from different perspectives under the same (or different) lighting conditions. The 3D model may be generated based on the first plurality of images using, for example, photogrammetry techniques.

The instructions may also cause the at least one hardware processor to generate a texture model of a texture of a material at least in part by analyzing a second plurality of images of the material captured using a second scanning device. The second scanning device may be separate and distinct from the first scanning device. The second plurality of images may be, for example, captured from the same perspective under different lighting conditions (e.g., each image is captured under a specific lighting condition selected from a set of two or more lighting conditions). The texture model may be generated based on the second plurality of images by, for example, analyzing the shadows in each of the plurality of images created by the varying lighting conditions to identify small surface features (e.g., texture). The instructions may also cause the at least one hardware processor to apply the texture model to the 3D model to generate a textured 3D model of the object.

The inventors have also appreciated that conventional 3D scanning devices are typically designed for in-frequent use and, thereby, may require in excess of 20 minutes to perform a scan. Such 3D scanning devices are not scalable to generate 3D models for thousands of objects. For example, a company may need to scan 5,000 products. In this example, a conventional 3D scanner may require in excess of 1,600 hours of scanning time alone to generate 3D models for all of these products.

Accordingly, the inventors have further devised new scanning systems and associated methods to generate high-quality 3D models (and/or textured 3D models) in less time than conventional techniques. Thereby, 3D models (and/or textured 3D models) for a large volume of objects may be quickly generated. In some embodiments, the scanning system comprises a rotation device that is configured to receive an object and rotate the object about at least one axis. The scanning system may further comprise an imaging system with a plurality of imaging sensors that are configured to image the object on the rotation device from multiple perspectives. For example, the rotation device may rotate the object between a plurality of angular positions (e.g., 2 positions, 3 positions, 4 positions, 5 positions, 6 positions, 7 positions, 8 positions, 9 positions, 10 positions, 11 positions, 12 positions, 13 positions, 14 positions, 15 positions, 16 positions, 17 positions, 18 positions, 19 positions, 20 positions, etc.) and the imaging system may capture one or more images of the object at each of the plurality of positions.

The scanning system may further comprise a lighting system that is configured to illuminate the object while the plurality of imaging sensors are imaging the object on the rotation device. The lighting system may comprise a plurality of light sources such as light emitting diodes, fluorescent lamps, and/or incandescent bulbs. The light from one or more light sources of the plurality of light sources may be diffused using, for example, a diffusive element disposed between the one or more light sources and the object. The plurality of light sources may be configured to emit the same type of light or different types of light. For example, a first light source may be configured to emit light in a first spectrum (e.g., white light having a wavelength between 450 nanometers (nm) and 650 nm) and a second light source be configured to emit light in a second spectrum (e.g., ultraviolet light having a wavelength between 315 nm and 400 nm). In this example, the scanning system may further comprise a spraying system configured to spray the object with a material that fluoresces under ultraviolet light and is transparent under white light. Thereby, the surface features of the object (e.g., small surface features, a contour of the object, etc.) may be more visible when ultraviolet light is employed to illuminate the object while other characteristics (such as a color of the object) may be more visible when white light is employed to illuminate the object.

The scanning system may comprise at least one computing device communicatively coupled to one or more components of the scanning system (e.g., the rotation device, the plurality of imaging sensors, and/or the lighting system) and configured to control the one or more components of the scanning system to generate a 3D model of an object. For example, the computing device may control one or more components of the scanning system to capture a plurality of images of the object from multiple perspectives at least in part by: (1) controlling the lighting system to illuminate the object on the rotation device with light; (2) controlling the plurality of imaging sensors to capture a first set of images of the object illuminated with the light; (3) controlling the rotation device to rotate the object from a first position to a second position that is different from the first position; and (4) controlling the plurality of imaging sensors to capture a second set of images of the object in the second position and illuminated with the light. The at least one computing device may, in turn, employ the plurality of captured images from multiple perspectives to generate a 3D model of the object using, for example, photogrammetry techniques (e.g., stereophotogrammetry techniques). It should be appreciated that the at least one computing device may also generate a texture model to accompany the 3D model (e.g., thereby forming a textured 3D model). For example, the at least one computing device may employ photogrammetry techniques (e.g., stereophotogrammetry techniques) to generate a textured 3D model of the object that includes both the 3D model and a texture model associated with the 3D model.

In some embodiments, the at least one computing device is configured to automatically identify a scale of the 3D model for an object. In these embodiments, at least two of the plurality of imaging sensors in the imaging system may be located a fixed distance apart. The known, fixed distance between the at least two imaging sensors may be employed to identify a scale of the model. For example, the at least one computing device may identify a relationship between the distance between the at least two imaging sensors and a size of the object using the plurality of captured images (e.g., the size of the object is equal to a distance between the at least two imaging sensors multiplied by a known constant). In this example, the fixed distance may be employed in combination with the determined relationship between the distance between the at least two imaging sensors and a size of the object to identify a scale of the 3D model for the object.

As discussed above, a texture model may be generated separately from the 3D model and applied to the 3D model to form textured 3D models. Thereby, the texture models may be interchanged to generate different textured 3D models. The inventors have also appreciated that conventional material scanning devices are typically designed for in-frequent use and, thereby, may require a considerable amount of time to generate a texture model (e.g., 1 hour per scan) and/or include steps that a human must perform manually (e.g., moving a lighting source, moving a camera, etc.). Such material scanning devices are not scalable to generate texture models for thousands of different materials. Further, conventional material scanning devices may generate low quality texture models, such as texture models with a lack of surface detail information, incorrect coloration, and/or incorrect shininess, and/or may be unable to scan materials with holes or transparent regions, such as meshes or loosely woven fabrics.

Accordingly, the inventors have further devised new scanning systems and associated methods to generate high-quality texture models faster than conventional techniques. In some embodiments, the scanning system comprises a housing configured to receive a material, such as a wood, a metal, a fabric, a leather, a glass, a ceramic, and a plastic. The housing may comprise, for example, a base having a top surface configured to receive the material and a plurality of walls (e.g., 2 walls, 3, walls, 4 walls, etc.) that are coupled to the base (e.g., the top surface of the base) and at least partially enclose the material. The top surface of the base may be, for example, a transparent surface that is configured to allow light to pass. Thereby, the material may be illuminated from underneath the top surface of the base by integrating a light source into the base that emits light towards the top surface of the base. Illuminating the material from underneath the top surface may allow the scanning system to accurately generate texture models for textures of materials with holes and/or transparent regions, such as a mesh or a loosely woven fabric.

The scanning system may further comprise at least one imaging sensor coupled to the housing and disposed above the material. The at least one imaging sensor may be held in a fixed position over the material by, for example, a frame that is coupled between the at least one imaging sensor and the housing. The scanning system may further comprise a lighting system coupled to the frame that is also disposed above the material. The lighting system may comprise, for example, a plurality of light sources each disposed at different positions above the material and configured to emit light to illuminate the material.

The scanning system may further comprise at least one computing device communicatively coupled to one or more components of the scanning system (e.g., the at least one imaging sensor and/or the lighting system) and configured to control the one or more components of the scanning system to generate a texture model of a texture of the material. Thereby, the scanning system may be capable of automatically generating a texture model with minimal (or no) human intervention. The computing device may, for example, control one or more components of the scanning system to capture a plurality of images of the object under different lighting conditions at least in part by: (1) controlling the lighting system to illuminate the material with light emitted by a first light source of the plurality of light sources disposed at a first position; (2) controlling the at least one imaging sensor to capture a first image of the material illuminated with light from the first light source disposed at the first position; (3) controlling the lighting system to illuminate the material with light emitted by a second light source of the plurality of light sources disposed at a second position that is different from the first position; (4) controlling the at least one imaging sensor to capture a second image of the material illuminated with light from the second light source disposed at the second position. The plurality of captured images of the material under different lighting conditions may be employed to generate a texture model of a texture of the material. The texture model may be generated by, for example, analyzing shadows in the captured images caused by the different lighting conditions that are, for example, indicative of a structure of surface features on the material.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the technology described herein are not limited in this respect.

Example 3D Scanning Systems

FIG. 1 shows an example 3D scanning system 100 that is configured to generate a 3D model of an object 110. The object 110 may be, for example, a piece of furniture such as: a couch, a chair, a desk, a table, a shelf, a bookcase, a bed, a nightstand, a cabinet, a rug, a dresser, a wardrobe, an entertainment center, and a decorative item (e.g., a statute, a piece of wall art, a picture frame, a book, and a vase). In some embodiments, the scanning system may generate a 3D model of the object 110 by, for example, capturing a plurality of images of the object 110 from multiple perspectives and analyzing the plurality of captured images using photogrammetry techniques to generate the 3D model. The plurality of captured images of the object 110 may be captured by, for example, a plurality of imaging sensors 114A-114C in an imaging system 102. The imaging system 102 may be mounted to a frame 112 to keep one or more of the imaging sensors 114A-114C at a fixed position relative to each other and/or the object 110. The object 110 may be rotated by a rotation device 106 between captured images to allow the imaging system to capture images of the object 110 from different perspectives. A lighting system 104 may illuminate the object 110 using a plurality of light sources 116A and 116B while the imaging system 102 captures images of the object 110. The plurality of light sources 116A and 116B may be used alone or in combination with a diffusive element 118 that diffuses light from the plurality of light sources 116A and 116B. A computing device 108 may be communicatively coupled to the rotation device 106, the lighting system 104, and/or imaging system 102 to, for example, control their operation.

The imaging system 102 may be configured to capture a plurality of images of the object 110 from multiple perspectives using imaging sensors 114A-114C. The imaging sensors 114A-114C may, for example, all be located in a common plane that is perpendicular to a top surface of the rotation device 106 and aimed at the object 110. For example, the imaging sensors 114A-114C may be positioned at fixed points along a half-circle that goes over the object 110 using the frame 112. The imaging sensors 114A-114C may be implemented in any of a variety of ways. For example, one or more of the imaging sensors 114A-114C may be digital single-lens reflex (DSLR) cameras or digital single lens translucent (DSLT) cameras. Further, the imaging sensors 114A-114C may have the same construction or different constructions.

The rotation device 106 may be configured to rotate the object 110 about a central axis (e.g., an axis that is parallel to a common plane containing the plurality of imaging sensors 114A-114C). For example, the rotation device 106 may comprise a platform onto which the object 110 may be placed that is rotatably coupled to a base. The rotation device 106 may rotate the platform using a motor, such as a stepper motor or a servo motor, integrated into the base. The motor may be controlled based on control signals received from another device, such as the computing device 108. For example, the motor that rotates the object 110 may be coupled to a BLUETOOTH enabled power adapter that selectively provides power to the motor based on BLUETOOTH signals received from the computing device 108.

The lighting system 104 may be configured to illuminate the object 110 using light from a plurality of light sources 116A-116B. The light from the plurality of light sources 116A-116B may be diffused using diffusive element 118 to illuminate the object 110 more uniformly. The light sources 116A-116B may be configured to emit light with the same characteristics or different characteristics. The light sources 116A-116B may be implemented in any of a variety of ways, such as a light emitting diode, an incandescent light bulb, or a fluorescent lamp.

In some embodiments, the light source 116A may be configured to emit light with a different spectrum than the light source 116B. For example, light source 116A may be configured to emit white light (e.g., light having a wavelength between 450 nm and 650 nm) while the light source 116B may be configured to emit ultraviolet light (e.g., light having a wavelength between 315 nm and 400 nm). Employing light with different spectrums may advantageously improve the quality of a resulting 3D model generated by the scanning system 100. For example, the scanning system 100 may comprise a spraying device (not shown) that sprays the object 110 with a material that is transparent under white light and fluoresces under ultraviolet light. Thereby, the visible of surface features of the object 110 may be increased when the material fluoresces under ultraviolet light. In this example, the imaging system 102 may capture images of the object 110 while illuminated with ultraviolet light (e.g., only ultraviolet light) and while illuminated with white light (e.g., only white light). The captured images of the object 110 while illuminated with the ultraviolet light may be employed to determine the shape of the object 110 and the captured images of the object 110 while illuminated with white light may be employed to determine other characteristics of the object 110, such as color.

The computing device 108 may be configured to communicate with and control the imaging system 102, the lighting system 104, and/or the rotation device 106. For example, the computing device 108 may send signals and/or receive signals from the imaging system 102, the lighting system 104, and/or the rotation device 106. The signals may be transmitted wirelessly (e.g., a radio frequency (RF) signal, such as an RF signal transmitted over a BLUETOOTH wireless network, a WI-FI wireless network, and/or a ZIGBEE wireless network; an optical signal, such as an optical signal transmitted over an IrDA network; or an acoustic signal) or over a cable (e.g., an ETHERNET cable, an auxiliary cable, or a Universal Serial Bus (USB) cable).

In some embodiments, the computing device 108 may comprise multiple devices that are communicatively coupled. In these embodiments, a first device may perform a first subset of the functions of the computing device 108 and a second device may perform a second subset of the functions of the computing device 108 that is different from the first subset. For example, the computing device 108 may comprise a microcontroller communicatively coupled to a computer. In this example, the microcontroller may be configured to communicate with the imaging system 102, lighting system 104, and/or rotation device 106 to capture a plurality of images of the object 110 from multiple perspectives and send the plurality of captured images to the computer. The computer may, in turn, analyze the plurality of captured images to generate a 3D model of the object.

It should be appreciated that the 3D scanning system 100 may be configured to generate more than a 3D model of the object 110. In some embodiments, the 3D scanning system 100 may be configured to generate a texture model for the texture of the material(s) on the object 110 to accompany the 3D model of the object 110. Thereby, the 3D scanning system 100 may output a textured 3D model of the object 110. The 3D scanning system 100 may generate the texture model using the plurality of images of the object 110 captured while the object 110 is illuminated with visible light (e.g., white light). Further, the 3D scanning system 100 may generate an indication of the relationship between locations in the 3D model and locations in the texture model, such as a texture layout space (sometimes referred to as a UV map) that assigns portions of the texture model (e.g., pixels in the texture model) to faces on the 3D model. For example, the 3D scanning system 100 employ photogrammetry techniques to generate a textured 3D model of the object 110 that comprises a 3D model of the object 110, a texture model for the texture of the material(s) on the object 110, and a UV map that describes the relationship between the 3D model and the texture model.

Example Material Scanning Systems

Figure 2A:
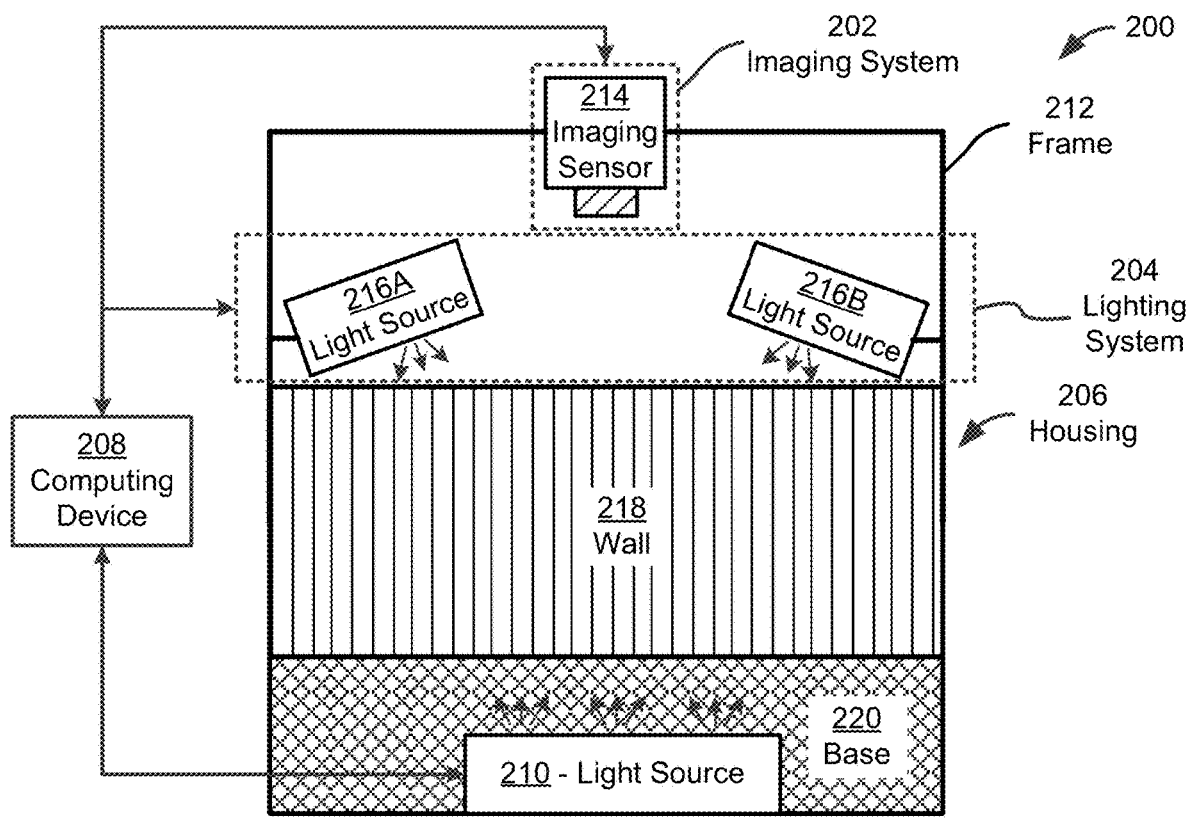
FIGS. 2A and 2B are diagrams of an example material scanning system, according to some embodiments of the technology described herein.
Figure 2B:
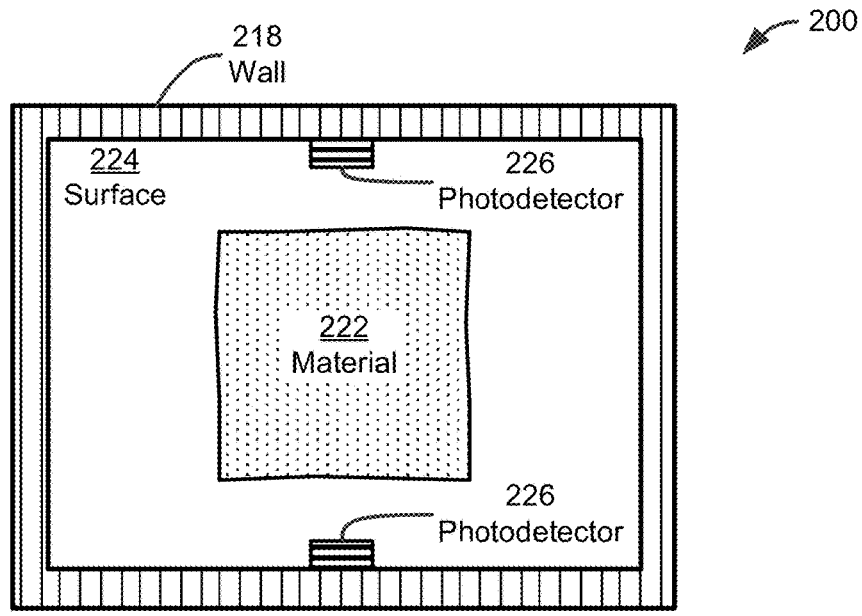

FIGS. 2A and 2B show an example material scanning system 200 that is configured to generate a texture model for a texture of a material 222. In particular, FIG. 2A shows a side view of the material scanning system 200 and FIG. 2B shows a top-down view of the material scanning system 200. The scanning system 200 comprises a base 220 having a top surface 224 configured to receive the material 222. The base 220 may be, for example, constructed with a transparent top surface 224 paired with a light source 210 that is configured to emit light towards the top surface 224 of the base 220. Alternatively, the base 220 may be constructed with an opaque top surface 224 and omit the light source 210. The top surface 224 of the base 220 is coupled to walls 218 that at least partially surround the material 222. Photodetectors 226 may be coupled to the top surface 224 of the base 220 and/or the walls 218. An imaging system 202 comprising an imaging sensor 214 is coupled to the housing 206 via a frame 212 and is disposed over the top surface 224 of the base 220 over the material 222. A lighting system 204 comprising a plurality of light sources 216A and 216B is also coupled to the housing 206 via the frame 212 and disposed over the top surface 224 of the base 220 over the material 222. A computing device 108 may be communicatively coupled to the imaging system 202, the lighting system 204, the photodetectors 226, and/or light source 210 to control their operation.

In some embodiments, the scanning system 200 may generate a texture model of a texture of the material 222 by, for example, capturing a plurality of images of the material 222 under different lighting conditions and analyzing the plurality of captured images to generate the texture model. The plurality of images of the material 222 may be captured by, for example, the imaging sensor 214 in the imaging system 202. The imaging system 202 may be mounted to the frame 212 to keep the imaging sensor 214 at a fixed position relative to the material 222 in all of the plurality of images. The differing lighting conditions may be created by varying which of the light sources 216A and 216B is turned on and/or turned off. For example, a first image of the material 222 may be captured while only light source 216A is on and a second image of the material 222 may be captured while only the light source 216B is turned on. The differing lighting conditions may cause different shadows to form in each of the plurality of images. The different shadows may be employed to, for example, identify the texture of the material 222.

The imaging system 202 may be configured to capture a plurality of images of the material 222 under different lighting conditions using imaging sensors 214. The imaging sensor 214 may, for example, be disposed over (e.g., directly over) the material 222 at a fixed position. The imaging sensor 214 may be implemented in any of a variety of ways. For example, one or more of the imaging sensor 214 may be digital single-lens reflex (DSLR) cameras or digital single lens translucent (DSLT) cameras.

The lighting system 204 may be configured to create different lighting conditions under which images of the material 222 may be captured. The lighting system 204 may comprise light sources 216A-216B that are each disposed at a different position over the material 222. For example, the lighting system 204 may comprise a first light source disposed over a first side of the material 222, a second light source disposed over a second side of the material 222 that is opposite the first side, a third light source disposed over a third side of the material 222 that is between the first and second sides of the material, and a fourth light source disposed over a fourth side of the material 222 that is opposite the third side of the material 222. The light sources 216A-216B may be aimed downward towards a point on the material 222 such as a center of the material 222 or a far edge of the material 222 (e.g., the edge of the material 222 that is furthest from the light source). Thereby, the light sources 216A-216B may create shadows on the surface of the material 222 that may, in turn, be analyzed to identify the characteristics of the surface. The light sources 216A-216B may be configured to emit light with the same characteristics or different characteristics. The light sources 216A-216B may be implemented in any of a variety of ways, such as a light emitting diode, an incandescent light bulb, or a fluorescent lamp.

In some embodiments, the intensity of the light sources 216A-216B may be controlled based on, for example, the output of the photodetectors 226. In these embodiments, a feedback loop may be employed where the settings of one or more of the light sources 216A-216B is controlled until a desired intensity (indicated by the photodetectors 226) is reached. For example, the computing device 208 may monitor an output of the photodetectors 226 and adjust a power setting of one or more of the light sources 216A-216B until the output of the photodetectors 226 is within a predetermined range.

The light source 210 may be configured to emit light through the top surface 224 of the base to illuminate the material 222 from underneath the top surface 224. Illuminating the material from underneath the top surface may, for example, allow the scanning system 200 to accurately generate texture models for textures of materials 222 with holes and/or transparent regions, such as a mesh or a loosely woven fabric. For example, regions in the images captured by the imaging sensor 214 within the material 222 that have a color that matches the color of the light emitted by the light source (e.g., regions that appear white from white light emitted by the light source 210) in all of the images may be identified as transparent portions of the material 222. The light source 210 may be advantageously configured to emit colored light (e.g., red light, blue light, green light, etc.) instead of white light to facilitate the identification of transparent portions of materials that are white. Thereby, the transparent regions of the white materials may appear to be a different color than the material itself in the images captured by the imaging sensor 214. For example, the light source 210 may be constructed to emit red light to illuminate a white material and the regions in the images captured by the imaging sensor 214 within the white material that appear red may be identified as transparent regions.

The computing device 208 may be configured to communicate with and/or control the imaging system 202, the lighting system 204, the light source 210, and/or the photodetectors 226. For example, the computing device 208 may send signals to and/or receive signals from the imaging system 202, the lighting system 204, the light source 210, and/or the photodetectors 226. The signals may be transmitted wirelessly (e.g., a radio frequency (RF) signal, such as an RF signal transmitted over a BLUETOOTH wireless network, a WI-FI wireless network, and/or a ZIGBEE wireless network; an optical signal, such as an optical signal transmitted over an IrDA network; or an acoustic signal) or over a cable (e.g., an ETHERNET cable or a Universal Serial Bus (USB) cable).

In some embodiments, the computing device 208 may comprise multiple devices that are communicatively coupled. In these embodiments, a first device may perform a first subset of the functions of the computing device 208 and a second device may perform a second subset of the functions of the computing device 208 that is different from the first subset. For example, the computing device 208 may comprise a microcontroller communicatively coupled to a computer. In this example, the microcontroller may be configured to communicate with the imaging system 202, the lighting system 204, the light source 210, and/or the photodetectors 226 to capture a plurality of images of the material 222 under different lighting conditions and send the plurality of captured images to the computer. The computer may, in turn, analyze the plurality of captured images to generate a texture model of a texture of the material 222.

Example Model Generation Processes

Figure 3:
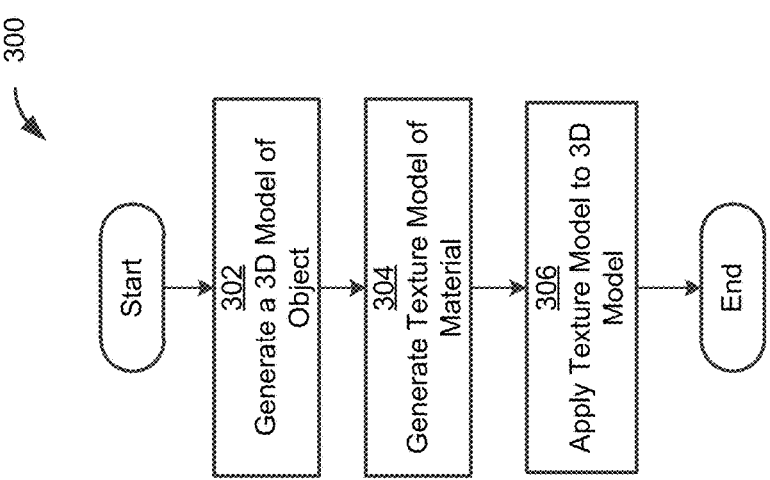
FIG. 3 is a flowchart of an example process for generating a textured 3D model of an object, according to some embodiments of the technology described herein.

FIG. 3 shows an example process 300 for generating a textured 3D model of an object. Process 300 may be performed by, for example, a computing device alone or in combination with the scanning system described herein (e.g., scanning systems 100 and/or 200). As shown, process 300 comprises an act 302 of generating a 3D model of an object, an act 304 of generating a texture model of a texture of a material, and an act 306 of applying the texture model to the 3D model.

In act 302, the computing device may generate a 3D model of an object. The computing device may generate the 3D of the object in any of a variety of ways. For example, the computing device may communicate with one or more components of a 3D scanning system, such as 3D scanning system 100 described above, to capture a plurality of images of the object from multiple perspectives. The computing device may, then, analyze the plurality of captured images using various techniques, such as photogrammetry techniques, to construct a 3D model. It should be appreciated that additional information associated with the 3D model may also be generated, such as a UV map that assigns portions of a texture model (e.g., pixels in a texture model) to faces on the 3D model. For example, the computing device may communicate with one or more components of a 3D scanning system, such as 3D scanning system 100 described above, to generate a textured 3D model that comprises a 3D model of the object, a texture model for the texture of the material(s) on the object, and a UV map that describes the relationship between the 3D model and the texture model.

In act 304, the computing device may generate a texture model of a texture of a material. The computing device may generate the texture model of the material in any of a variety of ways. For example, the computing device may communicate with one or more components of a material scanning system, such as material scanning system 200 described above, to capture a plurality of images of the material under different lighting conditions. The computing device may, in turn, analyze the plurality of captured images using various techniques to construct a texture model of the texture of the material.

In act 306, the computing device may apply the texture model to the 3D model of the object to generate a textured model. The computing device may apply the texture model to the 3D model in any of a variety of ways. In some embodiments, the computing device may apply the texture model to the 3D model using, for example, a UV map that assigns portions of a texture model (e.g., pixels in a texture model) to faces on the 3D model. The UV map may, for example, be generated in act 302 simultaneously with the 3D model. In these embodiments, the computing device may identify one or more surfaces of the 3D model which to apply a texture model and apply the texture model to the identified one or more surfaces of the 3D model using the UV map. For example, the object may be an upholstered chair with wooden legs and the computing device may identify the surfaces of the wooden legs which to apply a texture model for oak wood. In this example, the computing device may apply the texture model for the oak wood to the identified surfaces of the wooden legs of the upholstered chair using the UV map.

In some embodiments, the computing device may apply a texture model to one or more faces of the 3D model that is smaller in size than the one or more faces. In these embodiments, the computing device may repeat one or more portions of the texture model to fit the one or more faces of the 3D model (e.g., using the UV map). For example, a face of a 3D object to be textured may be a 1 meter by 1 meter square while the texture model only be a 500 centimeter by 500 centimeter square. In this example, the computing device may expand the texture model to form an expanded texture model that fits the 1 meter by 1 meter square surface by repeating the texture model 4 times (e.g., to form a 2 by 2 square that is 1 meter by 1 meter). The angle at which the expanded texture model is applied to and/or projected onto the 3D model may be determined based on the UV map. For example, the UV map may specify a flow direction of a material (e.g., a flow of a fabric) that is to be applied to and/or projected onto a given surface of the 3D model (e.g., a surface between two seams where a drastic flow direction of the material occurs). In this example, the expanded texture model may be applied to and/or projected onto the 3D model at an angle so as to have a flow direction that matches the flow direction specified by the UV map.

Figure 4:
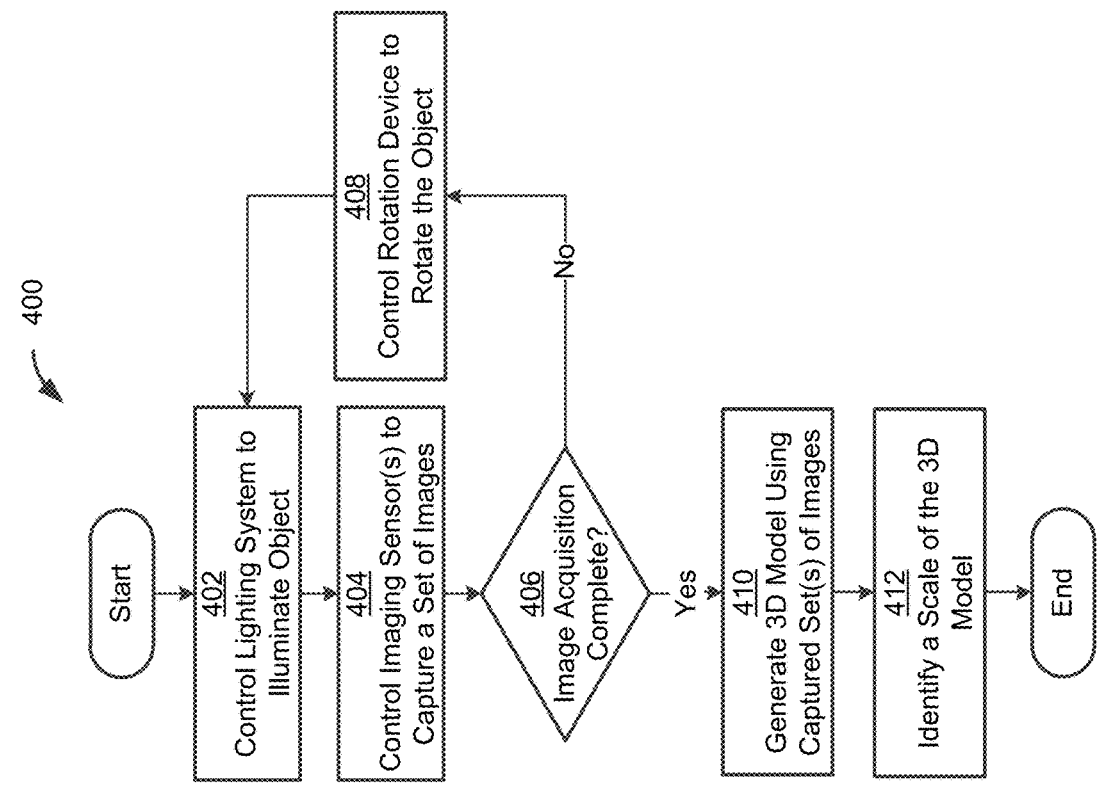
FIG. 4 is a flowchart of an example process for generating a 3D model of the object, according to some embodiments of the technology described herein.

FIG. 4 shows an example process 400 for generating a 3D model (and/or a textured 3D model) of an object. Process 400 may be performed by a 3D scanning system such as scanning system 100 described herein. As shown, process 400 comprises an act 402 of controlling a lighting system to illuminate the object, an act 404 of controlling imaging sensor(s) to capture a set of images, an act 406 of determining whether image acquisition is complete, an act 408 of controlling a rotation device to rotate the object, an act 410 of generating a 3D model (and/or a textured 3D model) using the captured set(s) of images, and an act 412 of identifying a scale of the 3D model.

In act 402, the scanning system may control the lighting system to illuminate the object. For example, the scanning system may turn on one or more light sources within the lighting system.

In act 404, the scanning system may control the imaging sensor(s) to capture a set of one or more images (e.g., images of the object). The set of one or more images may comprise a set of one or more images of the object captured while the scanning system is illuminating the object. In some embodiments, the set of one or more images may also include images of a calibration device to facilitate calibration of the scanning device. For example, at least some of the captured images may include a color calibration card comprising a plurality of known colors. In this example, the scanning system may employ the images of the color calibration card as reference to calibrate at least some of the plurality of imaging sensors. Additionally (or alternatively), the set of one or more images may also include images of the rotation device without any object. Thereby, the scanning system may be able to better distinguish the portion of each of the captured images that shows the object relative to the portion of each of the captured images that simply shows background (e.g., any portion of the captured images that do not contain the object). For example, a difference comparison may be performed between the captured image of the rotation device without an object and one or more captured images of the object on the rotation device to identify the object in the one or more captured images.

In act 406, the scanning system may determine whether image acquisition is complete. The scanning system may determine that image acquisition is complete using one or more predefined criteria, such as a threshold number of images have been captured and/or a threshold angular rotation of the object during the scanning process has been exceeded. If the scanning system determines that image acquisition is not complete, the scanning system proceeds to act 408 of controlling the rotation device to rotate the object and returns to act 402 to control the lighting system to illuminate the object. Otherwise, the scanning system proceeds to act 410 of generating a 3D model of the object using the captured set(s) of images.

In act 410, the scanning system may generate a 3D model of the object using the plurality of captured images. The scanning system may employ, for example, photogrammetry techniques (such as stereophotogrammetry techniques) to construct the 3D model from the plurality of captured images. Photogrammetry techniques may leverage distinctive features of the object (e.g., a wood grain) that appear in multiple images captured from different perspectives to generate the 3D model. For example, a first image may comprise a wooden surface with a knot in the center and a second image captured after the camera was moved relative to the object may comprise the wooden surface with the knot shifted to the left relative to the first image. In this example, the number of pixels the knot moved between the two images may be employed to determine the distance between the camera positions employed to capture the first and second images. Once the camera positions have been estimated, pixels in the two captured images that match (e.g., are associated with the same portion of the object) may be assigned to a point in 3D space based on the estimated camera positions (e.g., based on the parallax offset between the camera positions).

It should be appreciated that other techniques separate and apart from photogrammetry techniques described above may be employed to generate the 3D model. For example, depth-sensing cameras may be employed to generate the plurality of captured images. In this example, each of the captured images may comprise depth information indicative of the distance between the camera and the object in any given pixel. Thereby, the depth information from the plurality of captured images may be directly employed to generate the 3D model of the object.

In some embodiments, additional information regarding the object, separate from the 3D model of the object, may be generated in act 410 from the plurality of captured images. For example, a texture model for the texture of the material(s) on the object 110 to accompany the 3D model of the object 110 and/or a UV map that described the relationship between the 3D model and the texture model may also be generated (e.g., using photogrammetry techniques).

In act 412, the scanning system may identify a scale of the 3D model. The scanning system may identify the scale of the 3D model in any of a variety of ways. In some embodiments, a distance between at least two imaging sensors employed to capture images of the object may be located a fixed distance apart. In these embodiments, the scanning system may identify a relative distance between the two imaging sensors based on the captured images (e.g., the object height is 75% of the distance between the imaging sensors, the object height is 150% of the distance between the imaging sensors, etc.). This relative distance may be combined with the known, fixed distance between the imaging sensors to identify a scale of the object.

It should be appreciated that various alterations may be made to the process 400 without departing from the scope of the present disclosure. For example, the scanning system may use the same illumination scheme for capturing all of the images of the object. In this example, the scanning system may only perform act 402 of controlling the lighting system to illuminate the object once. Thereby, the scanning system may proceed from act 408 of controlling the rotation device to rotate the object directly to act 404 of controlling the imaging sensors to capture a set of images of the object (bypassing act 402 of controlling the lighting system to illuminate the object). Alternatively, the lighting system may be turned on manually by a human user and left on for the duration of process 400. Thereby, the scanning system may omit act 402 altogether from the process 400.

FIG. 5 shows an example process 500 of generating a texture model for a texture of a material. Process 500 may be performed by a material scanning system such as scanning system 200 described herein. As shown, process 500 comprises an act 502 of controlling a lighting system to illuminate a material, an act 504 of controlling imaging sensor(s) to capture image(s), an act 506 of determining whether image acquisition is complete, and an act 508 of generating a texture model using the captured images.

In act 502, the scanning system may control the lighting system to illuminate the material. For example, the scanning system may turn on one or more light sources. In some embodiments, the scanning system may measure the light intensity at one or more points within the material scanner using one or more photodetectors and adjust a setting of a light source based on the measured light intensity. For example, the scanning system may adjust an intensity of a light source until an output of the photodetectors is within a specified range.

In act 504, the scanning system may control the imaging sensor(s) to capture image(s) of the material.

In act 506, the scanning system may determine whether image acquisition is complete. The scanning system may determine that image acquisition is complete using one or more predefined criteria, such as a threshold number of images have been captured. If the scanning system determines that image acquisition is not complete, the scanning system returns to act 502 to control the lighting system to illuminate the material with a different set of lighting conditions than previously used (e.g., illuminate the material with light from a different set of light sources). Otherwise, the scanning system proceeds to act 508 of generating a texture model of the material using the captured set(s) of images.

In act 508, the scanning system may generate a texture model using the captured image(s). The scanning system may generate the texture model using the captured image(s) in any of a plurality of ways. For example, each of the plurality of images may be captured under different, non-uniform lighting conditions (e.g., illuminated with light sources from different directions) to create shadows in the image. In this example, the shadows may be analyzed to identify the texture of the material.

FIG. 6 shows an example process 600 for applying a plurality of texture models to a 3D model. Process 600 may be performed by, for example, a computing device. As shown, process 600 comprises an act 601 of segmenting a 3D model and an act 603 of applying texture models to the segmented 3D model. The act 601 of segmenting the 3D model comprises an act 602 of identifying a first portion of the 3D model and an act 604 of identifying a second portion of the 3D model. The act 603 of applying texture models to the segmented 3D model comprises an act 606 of applying a first texture model to a first portion of the 3D model and an act 608 of applying a second texture model to a second portion of the 3D model.

In act 601, the computing device may segment the 3D model into a plurality of portions. The computing device may segment the 3D model into a plurality of portions based on, for example, color (e.g., contiguous areas with the same color may be assigned to the same portion), angle between faces (e.g., steep angles between faces may indicate a division between two portions of the model), surface variation (e.g., surfaces that are soft and wrinkled are assigned to different portions than surfaces that are hard and unwrinkled), and/or flatness of faces (e.g., flat faces, such as those on a solid material, are assigned to different portions than faces that are rounded, such as those on a cushion). The computing device may segment the 3D model using any of a variety of techniques, such as clustering techniques. For example, the computing device may segment a 3D model of a couch into the following four sections: (1) couch legs; (2) couch cushions; (3) couch back; and (4) couch arms. The computing device may, for example, segment the 3D model at least in part by performing an act 602 of identifying a first portion of the 3D model and an act 604 of identifying a second portion of the 3D model that is separate and distinct from the first portion of the 3D model.

In act 603, the computing device may apply texture models to the segmented 3D model. The computing device may apply different texture models to different portions of the 3D model (e.g., using one or more UV maps). For example, the computing device may apply a texture model of wood to a section of a couch model that corresponds to the couch legs and apply a texture model of fabric to a section of the couch model that corresponds to a cushion. The computing device may, for example, apply the texture models to the segmented 3D model at least in part by performing an act 606 of applying a first texture model to a first portion of the 3D model and an act 608 of applying a second texture model to a second portion of the 3D model.

The processes described above are illustrative embodiments and are not intended to limit the scope of the present disclosure. The acts in the processes described above may be ordered in any suitable way. Accordingly, embodiments may be constructed in which acts are performed in an order different than illustrated, which may include performing some acts simultaneously, even though shown as sequential acts in illustrative embodiments.

Example Computing Device

Figure 7:
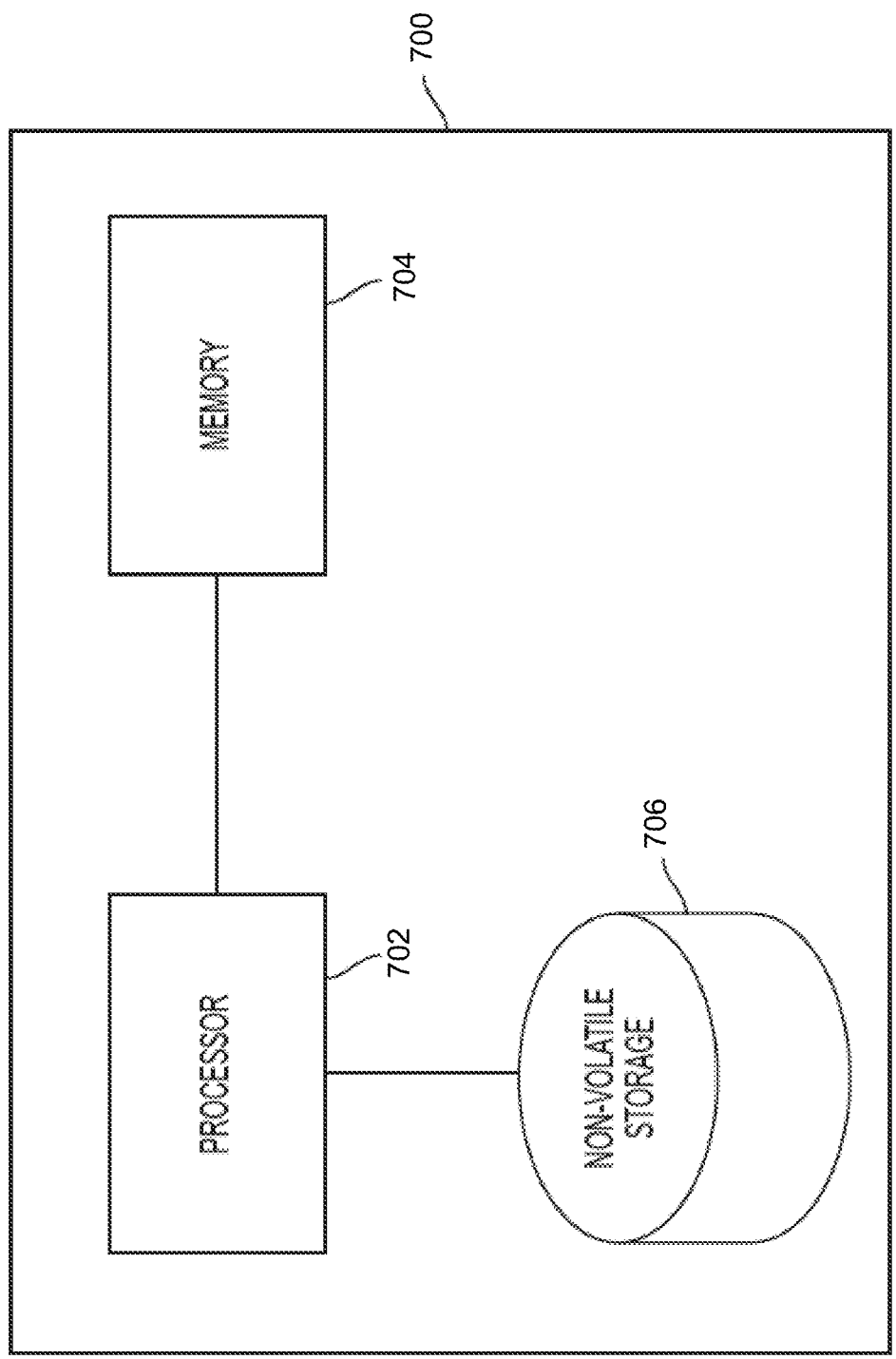
FIG. 7 is a block diagram of an example computer system, according to some embodiments of the technology described herein.

An illustrative implementation of a computing device 700 that may be used in connection with any of the embodiments of the disclosure provided herein is shown in FIG. 7. The computing device 700 may include one or more computer hardware processors 702 and one or more articles of manufacture that comprise non-transitory computer-readable storage media (e.g., memory 704 and one or more non-volatile storage devices 706). The processor 702($s$) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system, comprising:
   at least one hardware processor; and
   at least one non-transitory computer-readable storage medium storing processor executable instructions that, when executed by the at least one hardware processor, cause the at least one hardware processor to perform:
      generating a 3-dimensional (3D) model of an object at least in part by analyzing a first plurality of images of the object captured using a first scanning device;
      generating a texture model of a texture of a material at least in part by analyzing a second plurality of images of the material captured using a second scanning device different from the first scanning device, the material being separate and distinct from the object, wherein:
         the second scanning device comprises a lighting system comprising a first light source configured to emit light of a first color to illuminate the material, and
         generating the texture model comprises identifying one or more regions in the second plurality of images having a color that matches the first color of the light emitted by the first light source as one or more transparent regions of the material; and
      applying the texture model to the 3D model to generate a textured 3D model of the object.

2. The system of claim 1, wherein the second scanning device further comprises:
   a housing comprising a base having a top surface configured to receive the material having the texture, wherein the top surface comprises a transparent surface, and the first light source is configured to illuminate the material from underneath the top surface.

3. The system of claim 1, wherein the first scanning device comprises:
   a rotation device that is configured to receive the object and rotate the object about at least one axis; and
   a plurality of imaging sensors configured to image the object.

4. The system of claim 3, wherein generating the 3D model comprises:
   controlling the plurality of imaging sensors to capture a first set of images of the object in a first position;
   controlling the rotation device to rotate the object from the first position to a second position different from the first position;
   controlling the plurality of imaging sensors to capture a second set of images of the object in the second position; and
   generating the 3D model using the first set of images and the second set of images.

5. The system of claim 1, wherein the second scanning device further comprises:
   a housing configured to receive the material having the texture; and
   at least one imaging sensor coupled to the housing and disposed above the material, wherein the lighting system is coupled to the housing and comprises a plurality of light sources each configured to emit light to illuminate the material, the plurality of light sources comprising the first light source.

6. The system of claim 5, wherein generating the texture model comprises:

controlling the lighting system to illuminate the material with light emitted by a second light source of the plurality of light sources disposed at a first position;
controlling the at least one imaging sensor to capture a first image of the material illuminated with light from the second light source disposed at the first position;
controlling the lighting system to illuminate the material with light emitted by a third light source of the plurality of light sources disposed at a second position that is different from the first position;
controlling the at least one imaging sensor to capture a second image of the material illuminated with light from the third light source disposed at the second position; and
generating the texture model using the first and second images.

7. The system of claim 1, wherein the 3D model comprises a polygonal mesh and the texture model comprises at least one image.

8. A method, comprising:
generating a 3-dimensional (3D) model of an object at least in part by analyzing a first plurality of images of the object captured using a first scanning device;
generating a texture model of a texture of a material at least in part by analyzing a second plurality of images of the material captured using a second scanning device different from the first scanning device, the material being separate and distinct from the object, wherein generating the texture model comprises:
illuminating, using a first light source, the material with light of a first color, and
identifying one or more regions in the second plurality of images having a color that matches the first color as one or more transparent regions of the material; and
applying the texture model to the 3D model to generate a textured 3D model of the object.

9. The method of claim 8, wherein generating the 3D model comprises:
capturing, using a plurality of imaging sensors, a first set of images of an object in a first position;
rotating, using a rotation device, the object from the first position to a second position that is different from the first position;
capturing, using the plurality of imaging sensors, a second set of images of the object in the second position; and
generating the 3D model of the object using the first set of images and the second set of images.

10. The method of claim 9, wherein generating the 3D model comprises:
illuminating the object with a first light using a first light source; and
capturing the first set of images while the object is illuminated with the first light.

11. The method of claim 10, wherein generating the 3D model comprises:
illuminating the object with a second light that has a different spectrum from the first light using a second light source; and
capturing, using the plurality of image sensors, a third set of images while the object is illuminated with the second light.

12. The method of claim 11, wherein generating the 3D model of the object comprises:
generating the 3D model of the object using the first set of images, the second set of images, and the third set of images.

13. The method of claim 8, wherein generating the texture model comprises:
illuminating, using a second light source disposed at a first position, the material with light;
capturing, using at least one image sensor, a first image of the material illuminated with light from the second light source disposed at the first position;
illuminating, using a third light source disposed at a second position that is different from the first position, the material with light;
capturing, using the at least one imaging sensor, a second image of the material illuminated with light from the third light source disposed at the second position; and
generating the texture model using the first and second images.

14. The method of claim 13, wherein illuminating the material with light using the second light source or the third light source comprises:
reading a light intensity value from at least one photodetector; and
adjusting at least one setting of the second light source or the third light source based on the light intensity value.

15. A system, comprising:
at least one hardware processor; and
at least one non-transitory computer-readable storage medium storing processor executable instructions that, when executed by the at least one hardware processor, cause the at least one hardware processor to perform:
receiving a 3-dimensional (3D) model of an object comprising a first section and a second section different from the first section;
identifying a first portion of the 3D model that corresponds to the first section of the object;
identifying a second portion of the 3D model that corresponds to the second section of the object;
receiving a first texture model of a first texture and a second texture model of a second texture different from the first texture, wherein at least the first texture model is generated by:
illuminating, using a light source, the first texture with light of a first color, and
identifying one or more regions in a plurality of images of the first texture having a color that matches the first color as one or more transparent regions of the first texture;
applying the first texture model to the first portion of the 3D model; and
applying the second texture model to the second portion of the 3D model.

16. The system of claim 15, wherein the object is a piece of furniture.

17. The system of claim 16, wherein each of the first texture and the second texture is selected from the group consisting of: a wood, a metal, a fabric, a leather, a glass, a ceramic, and a plastic.

18. The system of claim 15, wherein the first section of the object comprises a fabric and wherein the first texture model is a texture model of a fabric swatch.

19. The system of claim 18, wherein the fabric swatch is a swatch of the fabric in the first section of the object.

20. The system of claim 19, wherein applying the first texture model to the first portion of the 3D model comprises:
applying the first texture model to the first section of the object using a UV map that describes a spatial relationship between at least part of the 3D model of the object and at least part of the first texture model.

\* \* \* \* \*